UNITED STATES PATENT OFFICE.

CARL ALEXANDER MARTIUS, OF BERLIN, GERMANY, ASSIGNOR TO THE ACTIEN-GESELLSCHAFT FÜR ANILIN FABRIKATION, OF SAME PLACE.

PROCESS OF MAKING AZO DYES.

SPECIFICATION forming part of Letters Patent No. 456,628, dated July 28, 1891.

Original application filed August 22, 1888, Serial No. 283,462. Divided and this application filed January 24, 1890. Serial No. 337,998. (Specimens.) Patented in Germany March 29, 1888, Nos. 47,068 and 47,136, and May 22, 1888, No. 46,971, and in England April 20, 1888, No. 5,909.

*To all whom it may concern:*

Be it known that I, CARL ALEXANDER MARTIUS, of Berlin, in the Kingdom of Prussia and German Empire, have invented certain new and useful Improvements in the Manufacture of Coloring-Matter, (for which I have obtained patents in England, No. 5,909, dated April 20, 1888; in Germany, Nos. 47,068 and 47,136, dated March 29, 1888, and No. 46,971, dated May 22, 1888;) and I do hereby declare that the following is a full, clear, and exact description of the invention, which will enable others skilled in the art to which it appertains to make and use the same.

This invention relates to certain improvements in the production of coloring-matters, more fully set forth hereinafter.

An alpha-naphthol disulphonic acid is formed by treating the naphthaline disulphonic acid (as obtained by treating naphthaline with sulphuric acid, monochlorhydrine, or forming sulphuric acid) with nitric acid, then reducing the alpha-nitronaphthaline disulphonic acids so formed to alpha-amidonaphthaline disulphonic acid and then converting the said alpha-amidonaphthaline disulphonic acid into the corresponding alpha-naphthol disulphonic acid. This alpha-naphthol disulphonic acid gives by the combination with tetrazo compounds violet or bluish violet azo coloring-matters of which the following forms an example.

Example: Twenty-one kilos of diamido stilbene are dissolved by means of fifty-eight kilos of muriatic acid and one thousand liters of water, and are then converted into the hydrochlorate of tetrazo stilbene by adding slowly a solution of fourteen kilos of nitrite of sodium in fifty liters of water. The tetrazo compound formed is then entered into a solution of thirty-five kilos of the dried sodium salt of the new alpha-naphthol disulphonic acid and forty-one kilos of acetate of sodium in one thousand liters of water. Thus an intermediate product is obtained which consists of one molecule of tetrazo stilbene and one molecule of alpha-naphthol disulphonic acid. This intermediate product is entered into an alkaline solution of a second molecule or twenty-five kilos of the new alpha-naphthol disulphonic acid. After the mixture of the components has stood for some hours it is heated, and the formed coloring-matter is separated by means of common salt, and is then filtered, pressed, and dried. It dies cotton with bluish-violet shades in a bath of sulphate of sodium without the use of a mordant.

In the above-described example the naphthol disulphonate of sodium, which is combined with the intermediate product of tetrazo stilbene and the new naphthol disulphonic acid, may be replaced by salts of other naphthol disulphonic acids, also by salts of alpha and beta naphthol or by alpha and beta naphtholmonosulphonic acid. The coloring-matters thus obtained also dye cotton with bluish-violet shades without the use of a mordant. Further, in the second example the diamido stilbene may be replaced in all cases by equivalent quantities of benzidine, or the tolidine, or dianisidine. If dianisidine is used, very clear shades are obtained. Some of these coloring-matters dye cotton with much greener shades than can be obtained by using the similar dye-stuffs which have hitherto been brought on the market.

This application is a division of an application for improvements in azo colors, filed by me August 22, 1888, Serial No. 283,462.

What I claim is—

The process of producing azo colors, which consists in first forming the alpha-naphthol disulphonic acid by treating naphthaline disulphonic acid with nitric acid, reducing the alpha-nitronaphthaline disulphonic acids so formed to alpha-amidonaphthaline disulphonic acid, and converting said alpha-amidonaphthaline disulphonic acid into the compound alpha-naphthol disulphonic acid; secondly, forming a tetrazo derivative of an amido compound, such as diamido-stilbene, benzidine, &c.; thirdly, adding to the solution of the tetrazo compound so formed the alpha-naphthol disulphonic acid in the proportions about as stated, to form a compound of one molecule of the tetrazo compound combined with one of the alpha-naphthol disulphonic acid, and, fourthly, adding to this compound a portion of naphthol or naphtholsulphonic acid in proportion about as stated, and, fifthly, precipitating the dye-stuff from the solution.

In testimony that I claim the foregoing as my own I affix my signature in presence of two witnesses.

CARL ALEXANDER MARTIUS.

Witnesses:
ARTHUR C. HALL,
HENRY BLAIR,
    9 Mount St., Manchester.